United States Patent Office 2,782,167
Patented Feb. 19, 1957

---

2,782,167

VISCOSITY INDEX IMPROVERS

Thomas S. Tutwiler, Elizabeth, N. J., assignor to Esso Research and Engineering Company, a corporation of Delaware No Drawing. Application November 30, 1950,
Serial No. 198,475

3 Claims. (Cl. 252—52)

This invention relates to lubricating oil additives and the process for their preparation. Particularly this invention relates to lubricant additive materials having the desirable characteristic of improving the viscosity index of lubricating oils with which they are blended. More particularly the invention relates to copolymers of alkoxy vinyl ethers and vinyl ethers useful for improving the rate of change of viscosity of lubricating oils with temperature change.

The concept of improving the rate of change of viscosity of the lubricating oil with a temperature change by the addition of viscosity index improvers is known in the art. Materials such as polyacrylates, polymethacrylates, polymerized isobutylene, and so forth are well known for this purpose and are disclosed in some detail in the patent literature.

For some purposes, however, these known viscosity index improvers have an undesirable property of unduly increasing the viscosity of a lubricating oil while the viscosity-temperature relationship is being improved. It is desirable that the rate of change of viscosity with temperature, generally referred to as the viscosity index of an oil, be improved without materially affecting the original viscosity of the oil, that is to say, without unduly increasing the viscosity of the composition.

It is known in the art of lubricant additive manufacture that polymers and copolymers of materials such as vinyl ethers, substantially improve the viscosity index of a lubricating oil when added thereto. U. S. Patents 2,020,714 and 2,016,490 disclose the use of copolymers of various vinyl or substituted vinyl ethers with other vinyl compounds.

It has now been found, and forms the object of this invention, that a lubricating oil additive material having outstanding characteristics of viscosity index improvement, coupled with a minimum amount of oil thickening, may be prepared by copolymerizing with at least one alkyl vinyl ether, an alkoxy vinyl ether as described hereinafter.

These new and improved viscosity index improvers are prepared by copolymerizing, in the presence of a Friedel-Crafts catalyst, an alkoxy vinyl ether having the general formula

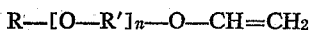

R—[O—R']n—O—CH=CH2 wherein R is an alkyl group containing from 1 to 20 carbon atoms, R' is a bivalent radical selected from the group consisting of methylene, ethylene, propylene and butylene, and n is an integer from 1 to 3 with at least one alkyl vinyl ether having the general formula

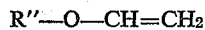

R"—O—CH=CH2 wherein R' is an alkyl group containing from 1 to 20 carbon atoms, R, R', and R" being chosen so that the average R+nR' and R" in the resulting copolymer is at least 4 carbon atoms when n=1, at least 6 when n=2, and at least 8 when n=3.

Among the alkoxy vinyl ethers that are operable for the formation of the copolymeric materials of invention may be mentioned 2-methoxy ethyl vinyl ether, 2-ethoxyethyl vinyl ether, 3-ethoxy propyl-1 vinyl ether, 2-butoxy ethyl vinyl ether, 2-butoxy 2-methyl ethyl vinyl ether, 2-isopropoxy methyl ethyl vinyl ether, 2-propoxy butyl-3 vinyl ether, 2-octyloxy 2-ethyl ethylvinyl ether, 2-octyloxy 1-ethyl ethylvinyl ether, 2-octyloxy ethoxy-ethoxy ethyl vinyl ether, hexadecyloxy ethoxy ethyl vinyl ether, 2-(2-ethylhexyloxy) ethoxy ethyl vinyl ether, 2-(2-ethoxy ethoxy) ethyl vinyl ether, 2-(2-butoxy ethoxy) ethyl vinyl ether, and the like. The alkyl vinyl ethers which are suitable include vinyl isobutyl ether, vinyl 2-ethyl hexyl ether, vinyl methyl ether, vinyl Lorol B ether, vinyl octadecyl ether, etc.

In the preparation of the copolymeric materials of this invention, the alkoxy vinyl ether and the alkyl vinyl ether may be reacted in ratios of from 1 to 60% by weight of the alkoxy vinyl ether with from 99 to 40% by weight of the alkyl vinyl ether. It is preferred that the ratio of the monomers be adjusted so that from 10 to 50% of the alkoxy vinyl ethers is copolymerized with from 90 to 50% of the alkyl vinyl ether.

Although the carbon chain length of the alkyl substituent group of the alkoxy vinyl ether may vary from 1 to 20 carbon atoms and of the alkyl vinyl ether from 1 to 20 carbon atoms, it is preferred that the alkyl substituent be selected so that the final copolymeric product has an average side chain length of from about 3 to about 8 carbon atoms, preferably from 4 to 6 carbon atoms.

It is preferred that the molecular weight of the polymeric materials of the invention average between 8,000 and 30,000 Staudinger.

To prepare the copolymers of invention, the monomeric materials are copolymerized in the presence of a Friedel-Crafts catalyst. Such catalysts as gaseous $BF_3$, $BF_3$ etherates, $AlCl_3$, $SnCl_4$, $ZnCl_2$ may be used as well as other ionic type catalysts such as acids, etc.

The copolymerization is carried out preferably by the bulk polymerization technique, utilizing diluents such as hydrocarbon and/or halogenated hydrocarbons to influence molecular weight control and to facilitate handling of the polymeric material.

Temperatures between a range of from 0° C. to —100° C. are operable, —70° C. to —80° C. being especially preferred. Internal coolants such as ethylene, Dry Ice, methyl chloride, etc., may be used to remove the heat of polymerization.

The copolymers of invention may be blended with the desired lubricating oil, either naturally occurring or synthetic, in amounts varying from 0.01% to 10.0% by weight, based on the weight of the total composition. It is usually found, and preferred, that an oil composition containing from 0.5% to 5.0% of the copolymers of invention are very satisfactory in regard to viscosity index improvement.

To more exactly define the instant invention, copolymeric materials were prepared utilizing the following technique.

The monomers were admixed with a methyl chloride diluent in monomer concentrations of from 20 to 80 volume percent. Dry Ice was used as an internal coolant employing copolymerization temperatures of from —70° to —80° C. The catalyst used was a 48% solution of $BF_3$ in ethyl ether or gaseous $BF_3$.

The polymeric materials of the invention were blended in varying proportions in a base oil which was a solvent extracted Mid-Continent distillate having a viscosity at 210° F. of 45.7 and a viscosity index of 113.0 Viscosity and viscosity index determinations were run on the blends and the data obtained are set out in Table I below:

of invention are much more stable to shear breakdown than are the commercial improvers tested.

TABLE I

| Example | Polymer Composition (Vinyl Ether) | Mo. Percent | Ave. C. Side Chain | Mol. Wt. | Wt. Percent Polymer in Oil A[1] | | | | | |
|---|---|---|---|---|---|---|---|---|---|---|
| | | | | | 1.2% | | 2.4% | | 3.6% | |
| | | | | | Vis./210° F., S. U. S. | V. I. | Vis./210° F., S. U. S. | V. I. | Vis./210° F., S. U. S. | V. I. |
| 1 | Isobutyl | 100 | 4 | 8,300 | 48.7 | 122.4 | 52.1 | 128.3 | 56.5 | 130.9 |
| 2 | Ethyl / 2-Ethylhexyl | 50 / 50 | 5 | 10,000 | 49.2 | 124.0 | 53.5 | 129.8 | 58.1 | 132.6 |
| 3 | 2-Methoxyethyl / 2-Ethylhexyl | 40 / 60 | 6 | 8,900 | 48.7 | 127.0 | 52.0 | 133.5 | 55.8 | 138.0 |
| 4 | 2-Methoxyethyl / Isopropyl / 2-Ethylhexyl | 10 / 50 / 40 | 5 | 10,000 | 49.2 | 125.5 | 53.0 | 131.0 | 57.3 | 134.5 |
| 5 | 2-Methoxyethyl / Isobutyl / 2-Ethylhexyl | 10 / 65 / 25 | 5 | 18,000 | 52.3 | 131.2 | 59.6 | 137.2 | 69.2 | 130.4 |
| 6 | 2-Methoxyethyl / Isobutyl / 2-Ethylhexyl | 20 / 50 / 30 | 5 | 13,500 | 50.6 | 129.0 | 56.7 | 136.0 | 62.7 | 138.5 |
| 7 | 2-Methoxyethyl / 2-Ethylhexyl | 40 / 60 | 6 | 14,400 | 50.0 | 131.5 | 55.7 | 141.0 | 61.8 | 145.0 |
| 8 | 2-Methoxyethyl / Isobutyl | 10 / 90 | 3.9 | 30,000 | 61.7 | 145 | 72.4 | 145.5 | 91.0 | 144.0 |

[1] Oil A = solvent extracted Mid-Continent distillate having a viscosity at 210°F. of 45.7 S. U. S. and a viscosity index of 113.0.

An examination of the data reported in Table I above particularly points out the desirable characteristics of the copolymeric materials of the instant invention. It is to be seen that the materials of Examples 1 and 2, which contain no alkoxy side chains, give substantially lesser degrees of viscosity index improvement in all concentrations than do the materials of Examples 3 to 8, all of which contain alkoxy side chains. It is also to be noted that the materials of Examples 1 and 3, having substantially the same molecular weight, show that in all concentrations tested the material containing the alkoxy side chains gives from 4.6 to 7.1 additional units of viscosity index improvement at the same or lower viscosity level. As has been pointed out above this is a very desirable feature of the copolymers of invention. It is also to be noted that, at substantially the same molecular weight level, increasing the percentage of the alkoxy side chains in the copolymer results in an increase in viscosity index improving potency (Examples 6 and 7).

A second important requisite for viscosity index improvers is that they do not lose their viscosity index increasing potency under conditions of high shear. The polymeric material of Examples 5 and 6 were subjected to a polymer stability test which consists of circulating an oil blend of the polymer through a McIntyre gear pump at 1,000 p. s. i. g. and a temperature of 200° F. for 1 hour, with determination of the viscosities and viscosity index of the blend before and after the test. The viscosity index unit loss and the percentage loss of S. U. S. viscosity at 210° F., due to the presence of the polymer, are reported in Table II below for Examples 5 and 6 and are compared with three commercial viscosity index improvers subjected to the same test.

TABLE II

*McIntyre gear pump test*

| Sample | Viscosity Index Unit Loss | Blend Inspections,[1] Percent Loss Vis./210° F. S. U. S. Based on Polymers |
|---|---|---|
| Example 5 | 1.5 | 8.0 |
| Example 6 | 1.0 | 6.0 |
| Commercial V. I. Improver A | 1.0 | 12 |
| Commercial V. I. Improver B | 3.6 | 24 |
| Commercial V. I. Improver C | 9.5 | 56 |

[1] Original blends at 77 S. U. S. at 210° F. in Coastal motor oil type base stock having 56.4 S. U. S. at 210° F. and 92 V. I.

It is to be seen from Table II above that the copolymers

To recapitulate briefly, this invention relates to the preparation of new and useful lubricating oil additives, and the products thereof, by copolymerizing an alkoxy vinyl ether with an alkyl vinyl ether in the presence of a suitable diluent and a Friedel-Crafts catalyst at a temperature within a range of from 0° to −100° C. for a period of time sufficient to obtain a polymeric material having a molecular weight within a range of from 8,000 to 30,000 Staudinger having the desirable characteristic of substantially improving the viscosity index of lubricating oils with which they are blended without an undue increase viscosity.

What is claimed is:

1. A lubricating composition comprising a lubricating oil having combined therein from 0.01% to 10.0% by weight of an oil soluble copolymer of from 20% to 50% by weight of a methoxy vinyl ether having the general formula $$CH_3-(O-CH_2-CH_2)_n-O-CH=CH_2$$

wherein $n$ is an integer from 1 to 2 with from 80% to 50% by weight of an alkyl vinyl ether having the formula $$R-O-CH=CH_2$$

wherein R is an alkyl group containing from 6 to 10 carbon atoms, said copolymer having a molecular weight within a range of from 8,000 to 30,000 Staudinger.

2. A lubricating composition comprising a lubricating oil having combined therein from 0.5% to 5.0% by weight of a copolymer of from 10% to 50% by weight of 2-methoxy ethyl vinyl ether with from 90% to 50% by weight of an alkyl vinyl ether having from 6 to 10 carbon atoms in the alkyl group, said copolymer having a molecular weight within a range of from 8,000 to 30,000 Staudinger.

3. A lubricating composition comprising a lubricating oil having combined therein from 0.5% to 5.0% by weight of a copolymer of from 10% to 50% by weight of 2-methoxy ethyl vinyl ether with from 90% to 50% by weight of 2-ethyl hexyl vinyl ether, said copolymer having a molecular weight within a range of from 8,000 to 30,000 Staudinger.

(References on following page)

References Cited in the file of this patent

UNITED STATES PATENTS

| | | |
|---|---|---|
| 2,016,490 | Fikentscher | Oct. 8, 1935 |
| 2,020,703 | Schumann et al. | Nov. 12, 1935 |
| 2,020,714 | Wulff et al. | Nov. 12, 1935 |
| 2,104,000 | Reppe et al. | Dec. 28, 1937 |
| 2,426,852 | Wright | Sept. 2, 1947 |
| 2,479,146 | Wood | Aug. 16, 1949 |
| 2,544,375 | Butler | Mar. 6, 1951 |

OTHER REFERENCES

Lubricating oil aditives, Petroleum Refiner, vol. 28, No. 7, July 1949, pp. 125 and 126 pertinent.